INVENTORS.
WESLEY R. WAGNER
CHARLES A. BAYLON

Christensen Sanborn &
Matthews
ATTORNEYS

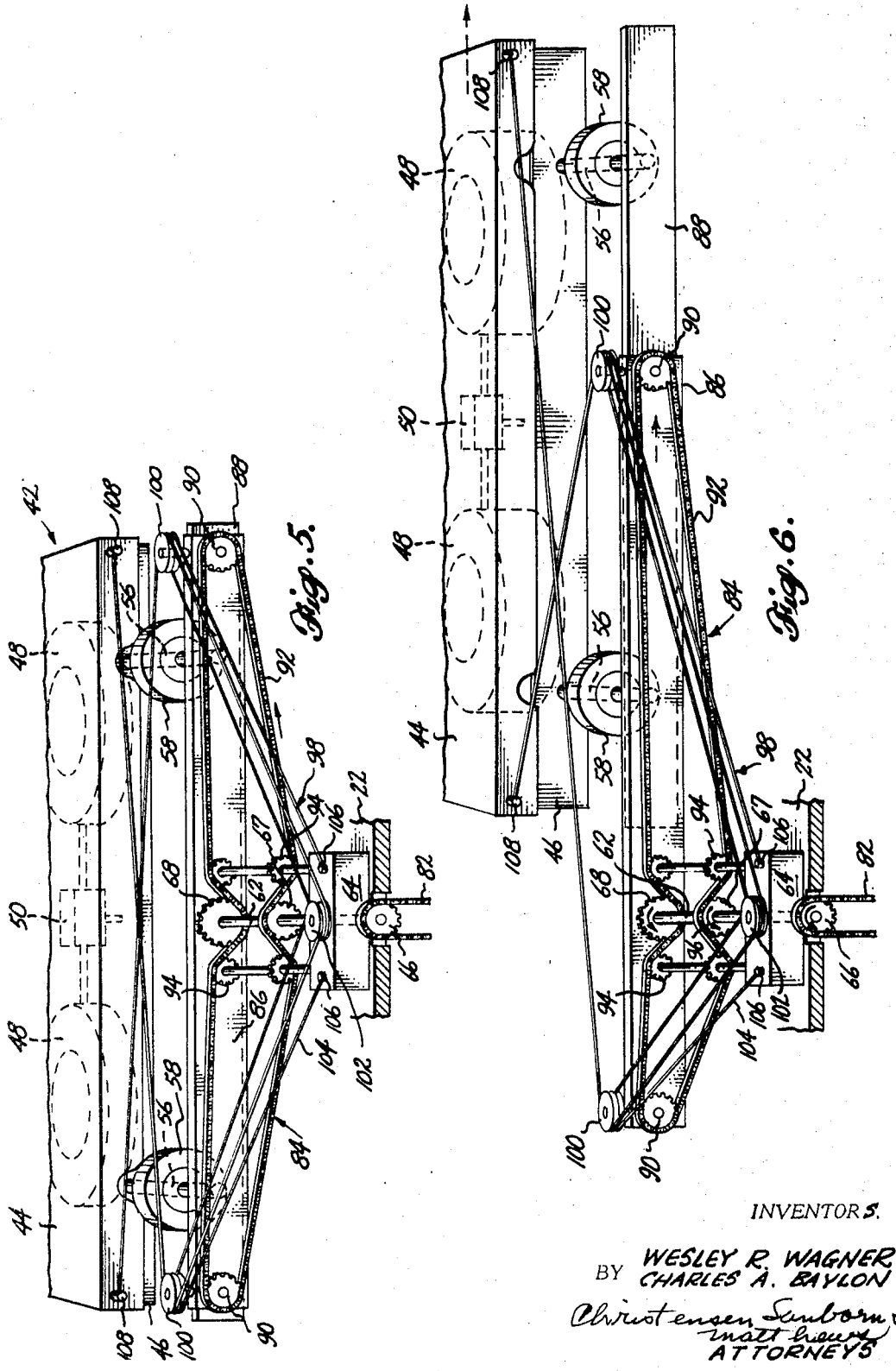

United States Patent Office 3,439,815
Patented Apr. 22, 1969

3,439,815
CABLE ARRANGEMENT FOR A LATERALLY
MOVABLE LOAD TRANSFER DEVICE
Wesley R. Wagner, Seattle, and Charles A. Baylon, Bellevue, Wash., assignors to Automated Towers Corporation, Seattle, Wash., a corporation of Washington
Continuation-in-part of application Ser. No. 475,653, July 29, 1965. This application Aug. 5, 1966, Ser. No. 570,664
Int. Cl. B65g 1/00; B66b 9/00
U.S. Cl. 214—16.1        15 Claims

ABSTRACT OF THE DISCLOSURE

A transfer device for handling materials is disclosed comprising a platform having a carriage thereon which is reciprocable between spaced points relatively on and off of the platform, and means for reciprocating the carriage between the aforesaid points. These means include a traveling reference which is slidably mounted on the platform to be reciprocated along a line parallel to the line connecting the aforesaid points, drive means for reciprocating the reference, a pair of freely rotatable wheels on the relatively opposite end portions of the reference in the directions of its travel, a third freely rotatable wheel on the platform intermediate the aforesaid reference wheels, and a pair of flexible bands interconnecting the platform with the carriage. Each band extends about the third wheel and a different one of the reference wheels, to cause the carriage to reciprocate with the reference, but at a greater rate of speed than the reference so that the carriage can be driven off of the platform, and then returned thereto.

---

This invention is a continuation-in-part of our earlier filed application Ser. No. 475,653, now abandoned, which was filed July 29, 1965 and entitled Materials Handling Tower Structure.

The invention herein described relates to the handling of goods and materials, and in particular to a transfer device for handling and storing goods and materials on shelves. One object of the invention is to provide a device of this type that is capable of loading and unloading the goods and materials in either a palletized or unpalletized condition, and yet without risk of damage to the goods and materials where they are fragile or otherwise sensitive to handling. Another object of the invention is to provide a device of this nature which is highly versatile and reliable in its operation, and which can be remotely controlled by a single operator, either through a hand actuated control system or an automatic system which is actuated by means of coded information cards. Still further objects include the provision of a transfer device of this nature which can be installed and operated in a storage structure at relatively low expense without decreasing the amount of space available for the actual storage of the materials.

These and other objects and advantages are realized by a transfer device of our invention comprising a platform having a carriage thereon which is reciprocable between spaced points relatively on and off of the platform, and means for reciprocating the carriage between the aforesaid points. These means include a traveling reference which is slidably mounted on the platform to be reciprocated along a line parallel to the line connecting the aforesaid points, drive means for reciprocating the reference, a pair of freely rotatable wheels on the relatively opposite end portions of the reference in the directions of its travel, and a third freely rotatable wheel on the platform intermediate the aforesaid reference wheels. A pair of flexible bands interconnect the platform with the carriage, and each extend about the third wheel and about a different one of the reference wheels, to cause the carriage to reciprocate with the reference, but at a greater rate of speed than the reference so that the carriage can be driven off of the platform, and then returned thereto. The drive means for the reference may include a pair of drive wheels on the platform with relatively different diameters, rotary drive means for turning the drive wheels at a common speed, and an endless flexible band interconnecting the drive wheels with the reference so that the operation of the rotary drive means causes the reference to reciprocate in relation to the platform. Also, the reference may be slidably mounted on the carriage.

In preferred embodiments of our invention, the carriage has a loading and unloading shuttle supported thereon. The shuttle can be raised and lowered in relation to the carriage, and there are means connected therewith for doing so.

Preferably, the platform is shiftable in relation to the ground so that it can be shifted to and from a location opposite the edge of a shelf. The shelf may have a slot therein which terminates at the edge thereof, opposite the location of the platform, to enable loading and unloading materials to and from the shelf by lowering and raising the shuttle through the slot. For example, the shuttle and the outline of the slot may have complemental projections thereon which interdigitate with one another as the shuttle is raised and lowered through the slot. Also, the shelf may have a subcompartment therebelow, and the carriage may be alternately supported by the platform and the floor of the subcompartment as it is reciprocated between points thereon.

Certain of our preferred embodiments have a flexible and inflatable bladder interposed between the shuttle and the carriage, together with means for inflating and deflating the bladder to raise and lower the shuttle in relation to the carriage.

These and other features of the invention will be better understood by referring to the accompanying drawings wherein we have illustrated the invention by applying it to a tower construction which is equipped with a rotatable elevator platform.

Figure 3:
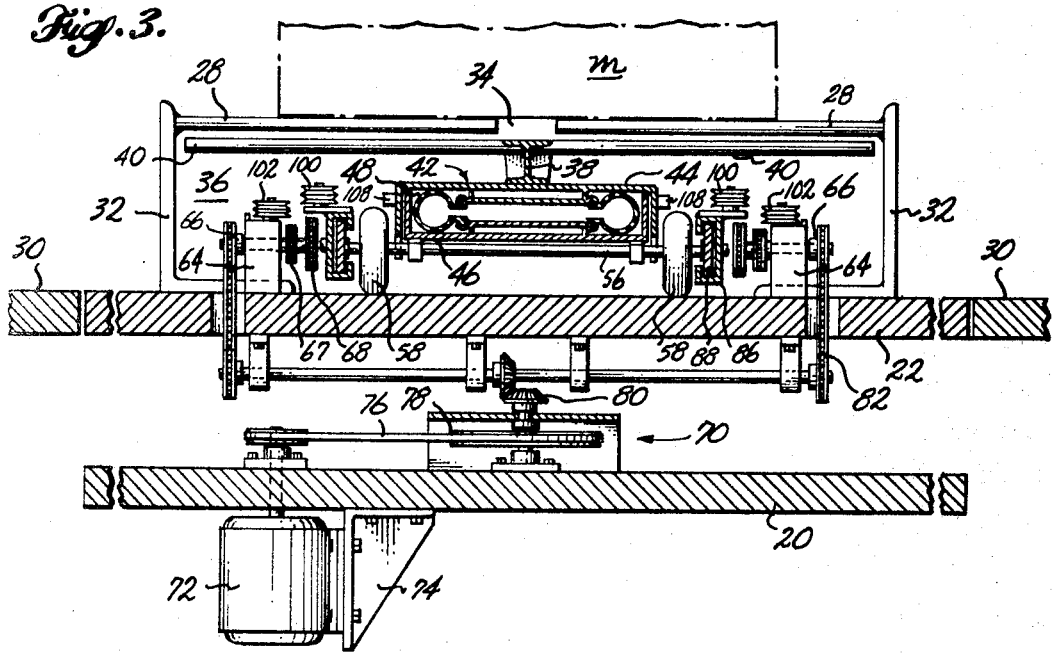
FIGURE 3 is a part cross section through the platform in FIGURE 2, including a portion of the structure in the compartment which is operationally aligned with the platform as it is seen in FIGURE 1.
Figure 4:
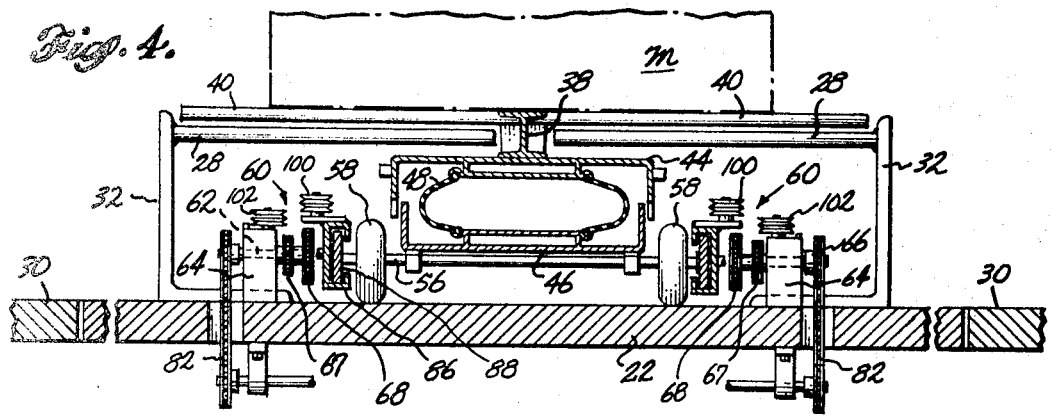
FIGURE 4 is a similar part cross-sectional view of the platform in a different operational state.
Figure 7:
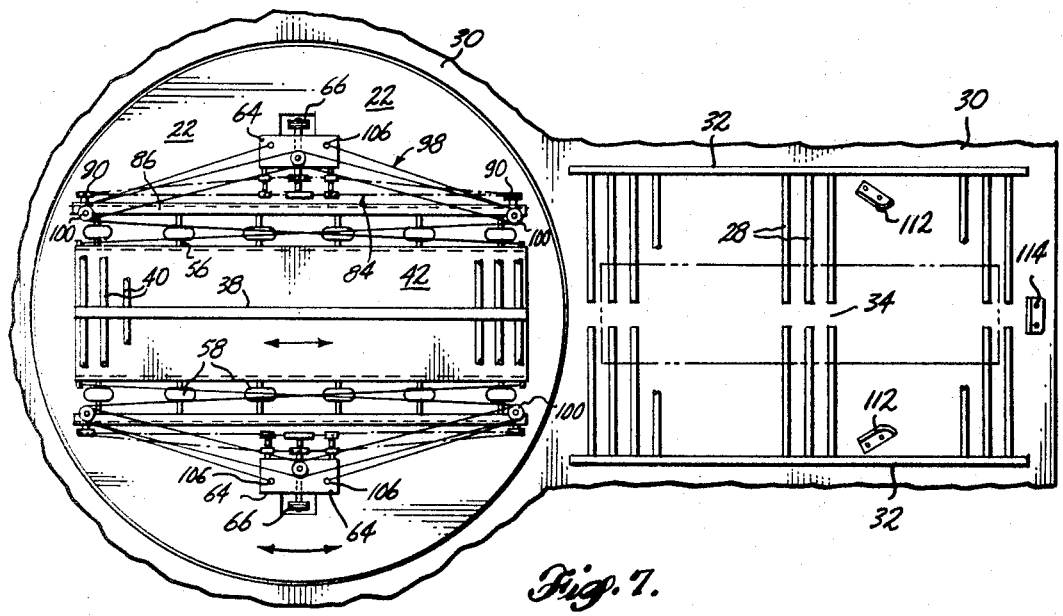
Figure 8:
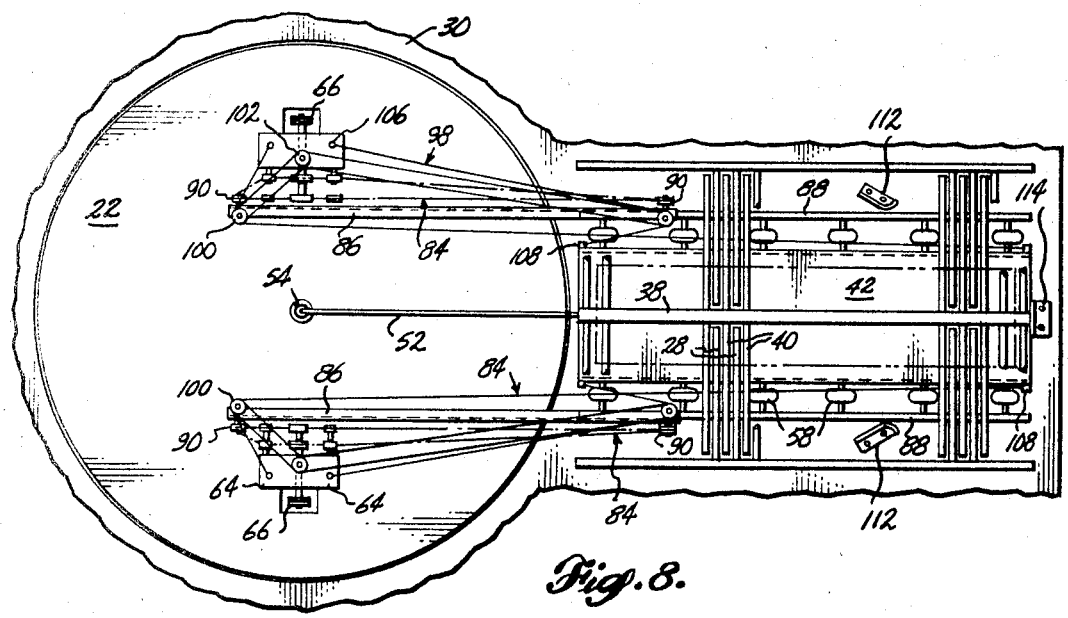

FIGURES 5 and 6 are schematic plan views of the platform and the compartment in the two different operational states of FIGURES 3 and 4; and FIGURES 7 and 8 are part perspective views of the drive mechanisms by which the jack is shifted into and out of the compartment for the two different operational states of FIGURES 5 and 6.

Figure 1:
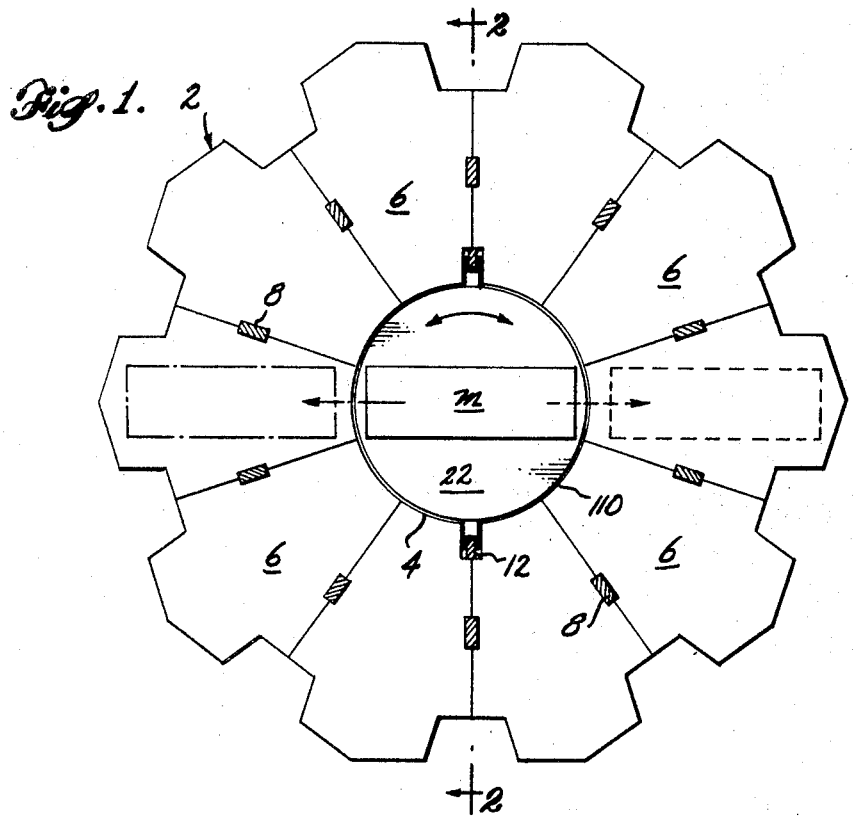
FIGURE 1 is a schematic plan view of the tower.
Figure 2:
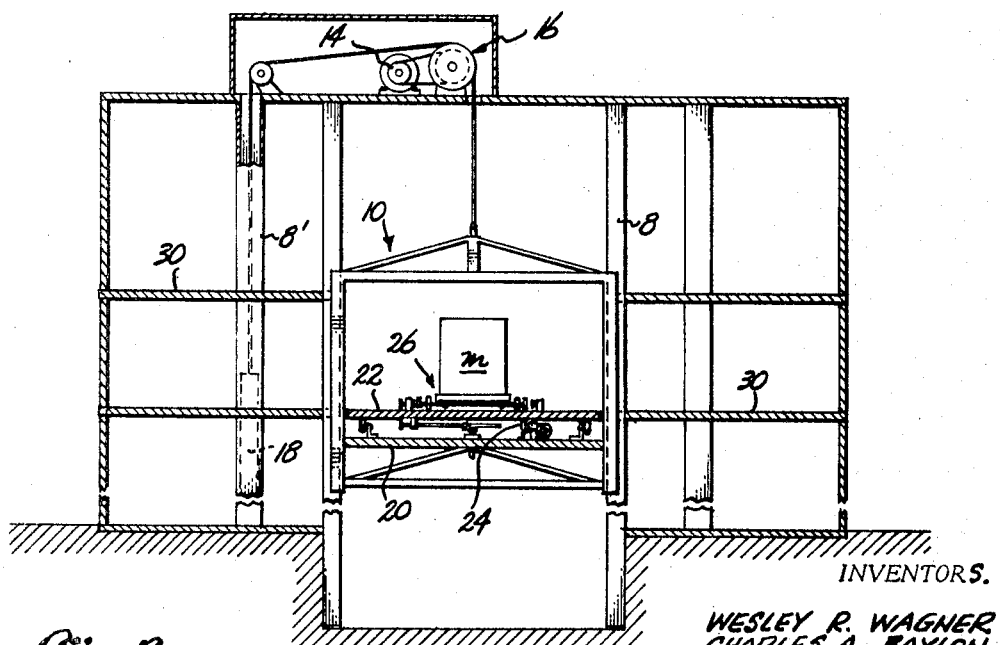
FIGURE 2 is an elevational cross section through the tower on the line 2—2 of FIGURE 1.

As seen in FIGURES 1 and 2, the tower 2 has stacks of compartments arranged in a ring about a central elevator shaft 4 which is open to each compartment 6 at its radially inwardly oriented end. The perimeter of the tower is multilobed for added strength and the various levels of compartments are supported on a series of columns 8 standing at equal angular intervals around the interior of the tower. The elevator 10 has an open frame which is slidably keyed to the shaft at 12 and suspended from a motor (14)-driven hoist 16 that is counterweighted at 18 in one 8' of the columns 8. Within the elevator frame are a pair of relatively superposed platforms 20 and 22, the lower 20 of which is fixed to the frame as a support for the upper 22 which is mounted on rollers and journaled in the frame to be rotated in the manner of a turntable at the instance of a motor 24 connected with one of the rollers. Thus, by the combined use of motors 14 and 24, materials M on the upper platform 22 can be raised and lowered to any level within the tower and selectively aligned with a compartment 6 or a pair of diametrically opposed compartments in the manner of FIGURE 1.

A shuttle mechanism 26 for installing and destalling the materials in and from a compartment is illustrated quite generally in FIGURE 2. Reference should be made to the remaining figures for a better illustration of the same. Firstly, it will be noted that each compartment 6 has a "shelf" of spaced parallel tines 28 that are elevated above the main structural floor 30 (FIGURE 1) at that level. A pair of angle irons 32 is secured to the structural floor of the compartment at parallels to and on equal spacings from the radial axis of the compartment. The irons serve as upright stanchions for the tines which project inwardly toward one another in two series from the insides of the irons. The series are of insufficient width to close the gap between the irons, however, and as a consequence, a clearance is left between them which is open to each end of the compartment so that the shelf in effect has an open-ended slot 34 along its radial axis.

The "subcompartment" 36 lying beneath the tines, between the irons, is designed to receive the carriage of a shuttle to be shifted into and out of the stacks. The shuttle is essentially an elongated I-beam 38 which has spaced parallel tines 40 extending laterally therefrom in an upper transverse body plane of the beam. The I-beam rests on an inflatable bladder or jack 42 which has telescoping upper and lower body sections 44 and 46 that house a pair of pneumatic tubes 48 which are inflatable to raise and lower the upper section 44 in relation to the lower section 46. The tubes are inflated by means of a compressor 50 (FIGURES 5 and 6) which is mounted within the body of the jack and remotely operated through a flexible electrical lead 52 (FIGURE 8) to the jack from a feed tube 54 in the center of the platform 22.

The lower body section 46 of the jack is equipped with a pair of transverse axles 56 which have wheels 58 thereon to form a carriage by which the jack 42 is rolled between alternate points on the rotatable platform 22 of the elevator and the structural floor 30 of the compartment. The carriage 46 is driven into and out of the compartment by means of a pair of differential drive mechanisms 60 (FIGURES 3 and 4) which apply a linear force to the axles 56 in the necessary direction. To each side of the carriage on the platform 22 is a shaft 62 which is journaled in a pillow block 64 and equipped with three wheels in the form of sprockets 66–68, one of which 66 serves as the driven sprocket in a belt, gear and chain drive mechanism 70 (FIGURE 3) which is powered by a motor 72 mounted on a bracket 74 below the lower platform 20 of the elevator. The rotation of the motor shaft is fed through a belt drive 76 to a sheave 78 centered below the carriage, which in turn drives the driven sprockets 66 through a pair of bevel gears 80 and a chain drive 82. The two remaining sprockets 67 and 68 on each pillow block shaft 62 serve as drive wheels in a pair of differential chain drive mechanisms 84 for a pair of reference channels 86 through which the rotation of the pillow block shafts 62 is translated into linear motion on the part of the carriage. The axles 56 carry a pair of outrigger rails 88 at their ends, over which the reference channels 86 are slidably engaged. As seen in FIGURES 5 and 6, the opposite ends of the channels are equipped with pairs of driven sprockets 90 which are interconnected through the sprockets 67 and 68 by endless flexible bands in the form of chains 92. The pillow blocks 64 also serve as mounts for pairs of idler sprockets 94 over which the chains 92 pass in extending from one driven sprocket 90 to the other. To achieve a differential effect, the drive sprockets 67 and 68 on each pillow block shaft 62 are characterized with differing pitch diameters and one length of the chain is passed over the outside drive sprocket 67 while the other length is passed under the inside drive sprocket 68. Consequently, when the pillow block shafts 62 are driven in the direction of the arrows 96, the inside lengths of chain are payed off of the inside drive sprockets 68 in the left hand direction at a faster rate of speed than the outside lengths are taken up by the outside sprockets 67. This exerts a pull on the left hand driven sprockets 90 with the result that the channels 86 are driven in the right hand direction in FIGURES 5 and 6.

The motion of the channels is transmitted to the wheels 58 of the carriage, in turn, by a pair of compound differential drive mechanisms 98 interconnecting the pillow blocks with the jack through the channels 80. The opposite ends of the channels have wheels in the form of stacked pairs of individually freely rotatable sheaves 100 which are journaled at points abreast the journals of the driven sprockets 90. The pillow blocks are similarly equipped with wheels in the form of stacked pairs of sheaves 102 which are likewise individually freely rotatable. Pairs of cables, belts or other flexible bands 104 extend from fixed anchor points 106 on the blocks, about the sheaves 100, then the pillow block sheaves 102, then once again about sheaves 100, and ultimately to fixed anchor points 108 on the opposite ends of the carriage. As the channels 86 undergo travel in the right hand direction in FIGURES 5 and 6, the motion of the channels is transmitted through the belt drives to the left hand points 108 on the carriage. The increased tension in the belts 104 exerts a pull on the carriage in the right hand direction, at an increased rate of speed over that exerted on the channels by the left hand driven sprockets 90, with the result that the carriage is propelled in the right hand direction at a greater rate of speed than the channels. As the pull continues, the carriage is propelled across the sliding joint 110 (FIGURE 1) between the platform 22 and the structural floor 30 of the compartment and into the subcompartment 36 below the tines 28 of the operating shelf, see FIGURE 8. In the subcompartment, a pair of slip guides 112 control the path of the carriage until ultimately it is stopped by a bumper 114.

Of course, to return the carriage to the platform from the subcompartment, the motor 72 is driven in the opposite direction to reverse the effect of the various drive mechanisms 70, 84, and 98 outlined above.

The materials M under conveyance are illustrated in phantom in FIGURES 3 and 4. In FIGURE 4, the materials are carried by the shuttle 38, 40 which is positioned by the jack 42 at a level of entry above the operating shelf 28 of the compartment. For purposes of installing the materials in the compartment, the jack is activated on the platform 22 prior to the introduction of the shuttle into the compartment. Then having moved the shuttle into the compartment along the slot 34, the jack is deflated to lower the materials onto the operating shelf as the shuttle drops into the position of FIGURE 3.

When destalling the materials, the process is reversed in that the jack is inserted into the subcompartment 36 in a deflated condition, then inflated to raise the shuttle through the slot 34 to lift the materials, and finally retracted to withdraw the materials from the compartment.

It will be recognized that the shuttle can be used to discharge goods and materials out through an opening in the perimeter of the tower. Assuming that there is an opening at the rear of the compartment, the jack can be inflated to raise the shuttle to a level of entry above the shelf 28 of the compartment, and then inserted into the compartment to bear the shuttle 38, 40 against the materials until they are forced out through the opening. Preferably, in such a case, the tines 28 of the shelf are in the form of rollers to facilitate the operation.

We claim as our invention:

1. A transfer device for handling materials comprising a platform having a carriage thereon which is reciprocable between spaced points relatively on and off of the platform, and means for reciprocating the carriage between the aforesaid points including a traveling reference which is slidably mounted on the platform to be reciprocated along a line parallel to the line connecting said points, drive means for reciprocating the reference, a pair of freely rotatable wheels on the relatively opposite end portions of the reference in the directions of its travel, a third freely rotatable wheel on the platform intermediate the aforesaid reference wheels, and a pair of flexible bands interconnecting the platform with the carriage, and each extending about the third wheel and about a different one of the reference wheels, to cause the carriage to reciprocate with the reference, but at a greater rate of speed than the reference so that the carriage can be driven off of the platform, and then returned thereto.

2. The transfer device according to claim 1 wherein the drive means for the reference include a pair of drive wheels on the platform with relatively different diameters, rotary drive means for turning the drive wheels at a common speed, and an endless flexible band interconnecting the drive wheels with the reference so that the operation of the rotary drive means causes the reference to reciprocate in relation to the platform.

3. The transfer device according to claim 1 wherein the reference is slidably mounted on the carriage.

4. The transfer device according to claim 1 wherein the carriage has a loading and unloading shuttle supported thereon.

5. The transfer device according to claim 4 wherein the shuttle can be raised and lowered in relation to the carriage, and there are means connected therewith for raising and lowering the shuttle.

6. The transfer device according to claim 5 wherein the shuttle is supported on a flexible and inflatable bladder, and there are means connected therewith for inflating and deflating the bladder.

7. The transfer device according to claim 4 wherein the shuttle has a series of spaced lateral projections thereon.

8. The transfer device according to claim 1 wherein the platform is shiftable in relation to the ground.

9. In combination, a shelf, a platform which is shiftable to and from a location opposite the edge of the shelf, a carriage on the platform which is reciprocable between points on the platform and the shelf, respectively, and means for reciprocating the carriage between the aforesaid points including a traveling reference which is slidably mounted on the platform to be reciprocated along a line parallel to the line connecting said points, drive means for reciprocating the reference, a pair of freely rotatable wheels on the relatively opposite end portions of the reference in the directions of its travel, a third freely rotatable wheel on the platform intermediate the aforesaid reference wheels, and a pair of flexible bands interconnecting the platform with the carriage, and each extending about the third wheel and about a different one of the reference wheels, to cause the carriage to reciprocate with the reference, but at a greater rate of speed than the reference so that the carriage can be driven onto the shelf, and then returned to the platform therefrom.

10. The combination according to claim 9 wherein the carriage has a shuttle thereon which can be raised and lowered in relation to the carriage, and the shelf has a slot therein which terminates at the edge thereof, opposite the location of the platform, to enable loading and unloading materials to and from the shelf by lowering and raising the shuttle through the air.

11. The combination according to claim 10 wherein the shuttle and the outline of the slot have complemental projections thereon which interdigitate with one another as the shuttle is raised and lowered through the slot.

12. The combination according to claim 9 wherein the shelf has a subcompartment therebelow, and the carriage is alternately supported by the platform and the floor of the subcompartment as it is reciprocated between points thereon.

13. In combination, a pair of relatively movable members which are reciprocable in relation to a surface, drive means for reciprocating one of the members, a pair of freely rotatable wheels on the relatively opposite end portions of the one member in the directions of its travel, a third freely rotatable wheel on the surface intermediate the aforesaid one member wheels, and a pair of flexible bands interconnecting the surface with the other member, and each extending about the third wheel and about a different one of the one member wheels, to cause the other member to reciprocate with the one member, but at a greater rate of speed than the one member so that the other member can be driven off of the surface, and then returned thereto.

14. The combination according to claim 12 wherein the drive means for the one member include a pair of drive wheels on the surface with relatively different diameters, rotary drive means for turning the drive wheels at a common speed, and an endless flexible band interconnecting the drive wheels with the one member so that the operation of the rotary drive means causes the one member to reciprocate in relation to the surface.

15. The combination according to claim 14 wherein the one member is slidably mounted on the other.

References Cited

UNITED STATES PATENTS

| 2,309,578 | 1/1943 | Drachman | 74—37 |
| 2,428,846 | 10/1947 | Sinclair | 114—16.1 |
| 2,647,647 | 8/1953 | Alimanestiano. | |
| 2,828,027 | 3/1958 | Stevenson et al. | |
| 2,838,186 | 6/1958 | Alimanestiano | 214—16.1 |
| 2,890,802 | 6/1959 | Alimanestiano | 214—16.1 |
| 2,915,204 | 12/1959 | Alimanestiano | 214—16.1 |
| 2,923,421 | 2/1960 | De Roumefort | 214—16.1 |
| 2,951,599 | 9/1960 | Bogar. | |

FOREIGN PATENTS

| 603,913 | 4/1960 | Italy. |
| 914,316 | 7/1954 | Germany. |

GERALD M. FORLENZA, *Primary Examiner.*

R. B. JOHNSON, *Assistant Examiner.*

U.S. Cl. X.R.

214—730; 254—143, 148